3,151,945
PROCESS FOR THE PRODUCTION OF PURE BOROHYDRIDES
Konrad Lang and Friedrich Schubert, Leverkusen, Germany, assignors to Farbenfabriken Bayer Aktiengesellschaft, Leverkusen, Germany, a corporation of Germany
No Drawing. Filed Jan. 20, 1959, Ser. No. 787,791
Claims priority, application Germany Feb. 3, 1958
5 Claims. (Cl. 23—312)

In all syntheses of alkali metal borohydrides carried out technically, the borohydride is obtained in a form contaminated with by-products of the reaction and with unreacted starting materials. Since the borohydrides are non-volatile salts which are very sensitive to $H^+$ ions, certain difficulties arise in the technical recovery thereof from the crude reaction products. These difficulties can in principle be overcome by the use of certain solvents; the best solvents of this type include organic, and more especially primary, amines, and liquid ammonia. Of these solvents, ammonia is of the greatest importance, because technically it is the solvent most readily obtainable. The extraction of the borohydride from the crude product with liquid ammonia does not offer any further difficulties, in the known processes since the reaction products consist of borohydride which is very readily soluble in liquid ammonia and by-products, for example NaF or $NaOCH_3$, which are practically insoluble in this solvent. Therefore, the solutions obtained can be directly concentrated by evoporation to obtain pure borohydride as the residue.

Recently, processes for the production of borohydrides have been described in which other substances, for example borates, occur along with the borohydride as secondary products, which substances show a clear degree of solubility in liquid ammonia, even if this solubility is lower than that of the borohydrides. This solubility is however found to have a nuisance value if the contaminated substances are present in relatively large quantity and/or the crude product is washed to exhaustion with relatively large quantities of ammonia. In this case, relatively large quantities of borate are dissolved in addition to borohydride and a borohydride which is very considerably contaminated, for example with borate, is obtained after evaporation.

The present invention is concerned with a process for the production of pure alkali metal borohydrides from mixtures of borohydrides and extraneous substances by extraction of these mixtures with liquid ammonia, the said process consisting in that the solutions obtained are concentrated by partial removal of the ammonia, preferably until the solution at room temperature has an ammonia vapour pressure which is less than atmospheric pressure, the extraneous substances precipitated from the solution are separated out and the ammoniacal borohydride solution thus obtained is, if necessary, concentrated by evaporation to dryness in known manner.

The new process will be described by way of example with reference to sodium borohydride, which technically is particularly important. The process consists in concentrating the dilute solutions which are formed in the extraction of the reaction products of the sodium borohydride manufacturing procedure (consisting of mixtures of sodium borohydride with sodium borates, sodium hydride, sodium silicate and sodium borosilicate or with sodium borate, calcium oxide and calcium hydride) with liquid anhydrous ammonia, which solutions also contain varying quantities of sodium borates as well as sodium borohydride. Concentration can in one case be effected by evaporating the ammonia, but in another case, especially when the extraction is effected continuously, can be effected by using the counter-current principle, in which fresh crude product comes into contact with solution which has already been initially concentrated. It is found in this case that the ammonia vapour pressure as regards the solution thus obtained decreases substantially more considerably with increasing concentration of borohydride than was to be expected from existing knowledge of solutions containing foreign ions. If certain pressure/temperature conditions are maintained during concentration, it is possible to obtain a solution of sodium borohydride in liquid ammonia which at room temperature has an ammonia vapour pressure of somewhat less than 760 mm. Hg; a reduction in vapour pressure of about 7.5 atm. thus occurs. Values of this order of magnitude are not known in an $H_2O$ system comparable to the ammonia system. With increasing concentration of sodium borohydride in the solution an increasing precipitation of borate is obtained, so that when the initial homogeneous dilute solution is concentrated by evaporation the result is a two-phase system consisting of solid sodium borate and liquid solution of borohydride in $NH_3$. The separation of the two phases by conventional technical methods is thereby particularly facilitated in that it is possible to work without pressure when using the concentrated solutions described above. The solutions which are thus obtained and which have a solid content in the region of 99% by weight of $NaBH_4$ only contain in addition about 1% by weight of sodium borate (initial solution, solid fraction for example 46% $NaBH_4$ and 54% sodium borate), can now be further concentrated by evaporation to solid sodium borohydride or alternatively can be used as such for chemical reactions. They can be stored in glass bottles without any additional protective measures.

*Example*

A dilute solution of sodium borohydride and sodium metaborate in liquid ammonia, which solution is obtained by the extraction of technical sodium borohydride (containing 9% by weight of $NaBH_4$ and 17.1% of $NaBO_2$ as well as relatively large quantities of CaO and also $CaH_2$) and the ratios between the dissolved quantities by weight of $NaBH_4:NaBO_2$ being 46:54 or 1:1.17, is concentrated by evaporation at a pressure of 8–10 atm. gauge and at 65°–70° C. until there is no further rise in pressure above 1 atm. after cooling to 20° C., pumping off the excess pressure and allowing the solution to stand. The suspension of $NaBO_2$ in the solution of $NaBH_4$ and residues of $NaBO_2$ is then allowed to settle in the liquid ammonia and the clear solution is syphoned off from the base substance. The clear solution contains 46% by weight of solid substance, consisting of 99.2% by weight of $NaBH_4$ and 0.8% by weight of $NaBO_2$, so that thereafter the ratio between $NaBH_4$ and $NaBO_2$ is 99.2:0.8 or 1:0.008. The free borohydride is recovered from the solution by concentrating by evaporation at 100° C.

We claim:
1. In a process for recovering alkali metal borohydrides from mixtures containing alkali metal borohydrides, alkali metal borates and at least one foreign substance selected from the group consisting of alkali metal hydrides, alkali metal silicates, alkali metal borosilicates, calcium oxide, and calcium hydride by extracting the mixture with liquid ammonia, the improvement which comprises concentrating the extracting ammoniacal solution by partial removal of the ammonia therefrom at a temperature higher than −33° C. to an extent that the solution at room temperature has an ammonia vapor pressure which is less than atmospheric pressure whereby the major part of the foreign substances is precipitated from solution, separating the precipitate and recovering the ammoniacal solution of alkali metal borohydrides.
2. Improvement according to claim 1 wherein the am- moniacal solution after concentration and separation of the precipitate is evaporated to dryness and solid alkali metal borohydride is obtained.

3. Improvement according to claim 1 which comprises effecting the extraction continually by allowing said ammoniacal solution of alkali metal borohydride to come in contact with said mixture of alkali metal borohydride, alkali metal borate and said foreign substances.

4. Improvement according to claim 1 wherein a dilute solution of sodium borohydride and sodium metaborate in the ratio of 1:1.7 in liquid ammonia is concentrated at 65 to 70° C. until no further pressure rise above 1 atmosphere occurs after cooling to 20° C., separating the clear solution from the solid sodium metaborate and recovering the sodium borohydride from the solution by evaporating at 100° C.

5. In the process for recovering sodium borohydride from mixtures containing sodium borohydride, sodium borate and at least one foreign substance selected from the group consisting of alkali metal hydrides, alkali metal silicates, alkali metal borosilicates, calcium oxide, and calcium hydride by extracting the mixture with liquid ammonia, the improvement which comprises concentrating the extracting ammoniacal solution by partial removal of the ammonia therefrom at a temperature higher than −33° C., the ammonia being removed to an extent that the solution at room temperature has an ammonia vapor pressure which is less than atmospheric pressure, whereby the major part of the foreign substances is precipitated from solution, separating off the precipitate and recovering an ammoniacal solution of said borohydride.

References Cited in the file of this patent

UNITED STATES PATENTS

| | | |
|---|---|---|
| 2,942,934 | Wade et al. | June 28, 1960 |

FOREIGN PATENTS

| | | |
|---|---|---|
| 774,728 | Great Britain | May 15, 1957 |
| 570,256 | Belgium | Aug. 30, 1958 |
| 594,414 | Canada | Mar. 15, 1960 |

OTHER REFERENCES

Kirk-Othmer, "Encyclopaedia of Chemical Technology," 1st supplement volume, 1957, pages 501–504.